(12) United States Patent
Su et al.

(10) Patent No.: US 6,483,843 B1
(45) Date of Patent: Nov. 19, 2002

(54) DETECTING AND COUNTING OPEN ORDERED SETS ORIGINATING FROM AN ATTACHED NODE PORT

(75) Inventors: Sam Su; Qing Xue, both of Irvine; Hossein Hashemi, Mission Viejo, all of CA (US)

(73) Assignee: Emulex Corporation, Costa Mesa, CA (US)

( * ) Notice: Subject to any disclaimer, the term of this patent is extended or adjusted under 35 U.S.C. 154(b) by 0 days.

(21) Appl. No.: 09/687,259

(22) Filed: Oct. 12, 2000

(51) Int. Cl.[7] .............................................. H04L 12/42
(52) U.S. Cl. ...................................... 370/425; 370/460
(58) Field of Search ................................ 370/216, 217, 370/221, 222, 254, 258, 403, 406, 425, 452, 459, 460, 906; 375/212; 709/252

(56) References Cited

U.S. PATENT DOCUMENTS

| | | | | |
|---|---|---|---|---|
| 4,899,142 A | * | 2/1990 | Nakayashiki et al. | 340/2.7 |
| 5,535,192 A | * | 7/1996 | Trubey et al. | 370/223 |
| 5,546,385 A | * | 8/1996 | Caspi et al. | 370/412 |
| 5,638,518 A | * | 6/1997 | Malladi | 709/236 |
| 5,751,715 A | * | 5/1998 | Chan et al. | 370/452 |
| 5,978,379 A | * | 11/1999 | Chan et al. | 370/400 |
| 6,064,679 A | * | 5/2000 | Hashemi et al. | 370/506 |
| 6,085,325 A | * | 7/2000 | Jackson et al. | 365/222 |
| 6,101,166 A | * | 8/2000 | Baldwin et al. | 370/222 |
| 6,188,668 B1 | * | 2/2001 | Brewer et al. | 370/222 |
| 6,215,775 B1 | * | 4/2001 | Baldwin et al. | 370/254 |
| 6,226,299 B1 | * | 5/2001 | Henson | 370/420 |
| 6,317,800 B1 | * | 11/2001 | Westby et al. | 710/107 |

* cited by examiner

Primary Examiner—Hassan Kizou
Assistant Examiner—Ahmed Elallam
(74) Attorney, Agent, or Firm—Fish & Richardson P.C.

(57) ABSTRACT

A hub port in a loop network is disclosed. The hub port includes a hub data source, first and second detect circuits, and a processor. The hub data source supplies data to the hub port from the loop network. The first detect circuit is configured to detect a first sequence from an attached node port establishing a loop circuit. The second sequence from the attached node port indicates to terminate the loop circuit. The processor is configured to receive the first sequence from the first detect circuit. Further, the processor operates to close a detect window and to increment a sequence origination count, if the detect window is open. The second detect circuit is configured to detect the second sequence from the hub data source confirming the termination of the loop circuit.

16 Claims, 4 Drawing Sheets

DETECTING AND COUNTING OPEN ORDERED SETS ORIGINATING FROM AN ATTACHED NODE PORT

BACKGROUND

The present invention relates to electronic network systems, and more specifically to detecting and counting Open Ordered Set originating from a node port in Fibre Channel.

Electronic data systems are often interconnected using network communication systems. Approaches that have been developed for computer network architectures include area-wide networks and channels. Traditional networks (e.g., LAN's and WAN's) may offer flexibility and relatively large distance capabilities. Channels, such as the Enterprise System Connection (ESCON) and the Small Computer System Interface (SCSI), have been developed for high performance and reliability. Channels often use dedicated short-distance connections between computers or between computers and peripherals.

Features of both channels and networks have been incorporated into the Fibre Channel standard. Fibre Channel systems combine the speed and reliability of channels with the flexibility and connectivity of networks. Fibre Channel products often run at high data rates, such as 266 Mbps or 1062 Mbps. These speeds are sufficient to handle quite demanding applications, such as uncompressed, full motion, high-quality video.

There are at least three ways to deploy a Fibre Channel network, which include simple point-to-point connections, arbitrated loops, and switched fabrics. The simplest topology is the point-to-point configuration, which simply connects any two Fibre Channel systems directly. Arbitrated loops are Fibre Channel ring connections that provide shared access to bandwidth via arbitration. Switched Fibre Channel networks, called "fabrics", are a form of cross-point switching.

Conventional Fibre Channel Arbitrated Loop (FC-AL) protocols provide for loop functionality in the interconnection of devices or loop segments through node ports. However, direct interconnection of node ports may be problematic since a failure at one node port in a loop may cause failure of the entire loop. This difficulty may be overcome in conventional Fibre Channel technology through the use of hubs. Hubs may include a number of hub ports interconnected in a loop topology. Node ports are connected to hub ports, forming a star topology with the hub at the center. Hub ports which are not connected to node ports or which are connected to failed node ports are bypassed. Therefore, the loop may be maintained despite removal or failure of node ports.

SUMMARY

The present disclosure includes a hub port in a loop network for detecting and counting open ordered sets originating from an attached node port. The hub port includes a hub data source, first and second detect circuits, and a processor.

The hub data source supplies data to the hub port from the loop network. The first detect circuit is configured to detect a first sequence from an attached node port establishing a loop circuit. The second sequence from the attached node port indicates to terminate the loop circuit. The processor is configured to receive the first sequence from the first detect circuit. Further, the processor operates to close a detect window and to increment a sequence origination count, if the detect window is open. The second detect circuit is configured to detect the second sequence from the hub data source confirming to terminate the loop circuit.

The present disclosure also includes a method for detecting and counting open-ordered sets. The method includes monitoring for an open ordered set originating from an attached node port and examining an open detect window, if the open ordered set is detected. The method also includes closing the open detect window and incrementing an open ordered set origination count, if the open detect window is open.

DETAILED DESCRIPTION

Figure 1:
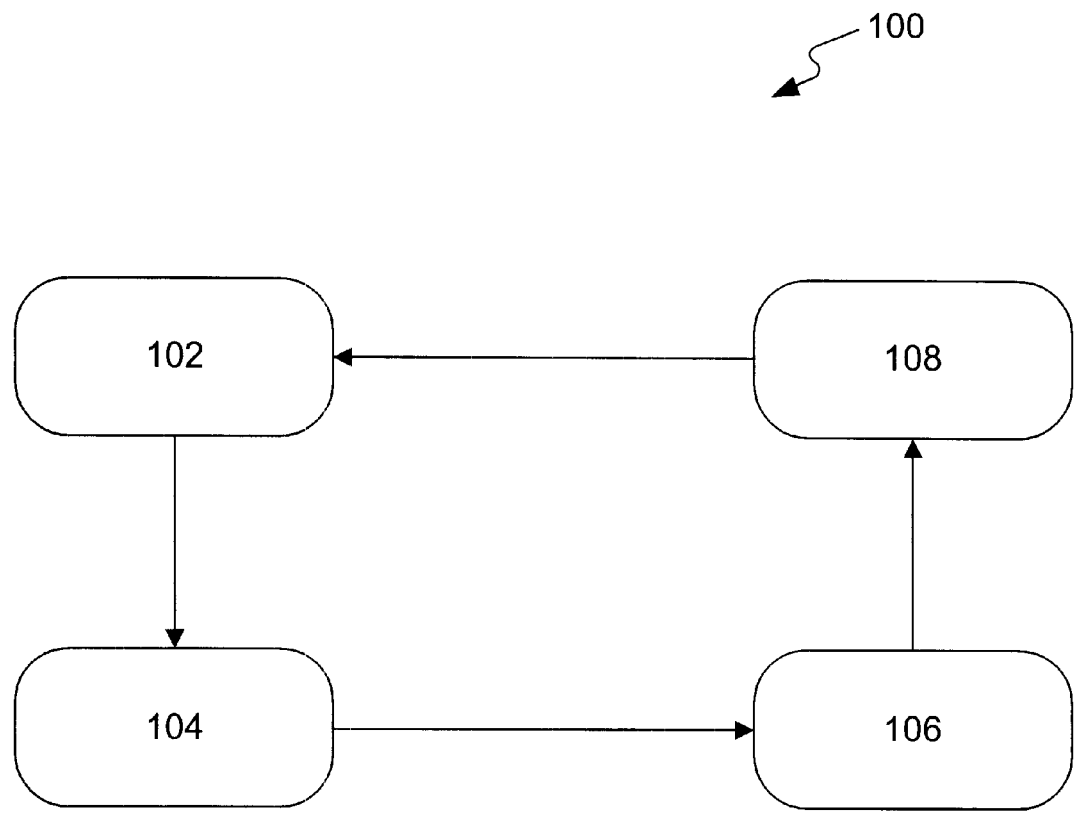
FIG. 1 shows a node port to node port loop.

A loop configuration 100 is illustrated in FIG. 1. Four node ports 102, 104, 106, 108 are shown joined together node port to node port. Each node port represents a connection to a device or to another loop. Node port 102 is connected to node port 104 such that data is transmitted from node port 102 to node port 104. Node port 104 is in turn connected to node port 106 that is in turn connected to node port 108. Node port 108 is connected to the first node port, node port 102. In this manner, a loop data path is established from node port 102 to node port 104 to node port 106 to node port 108 back to node port 102.

Figure 2:
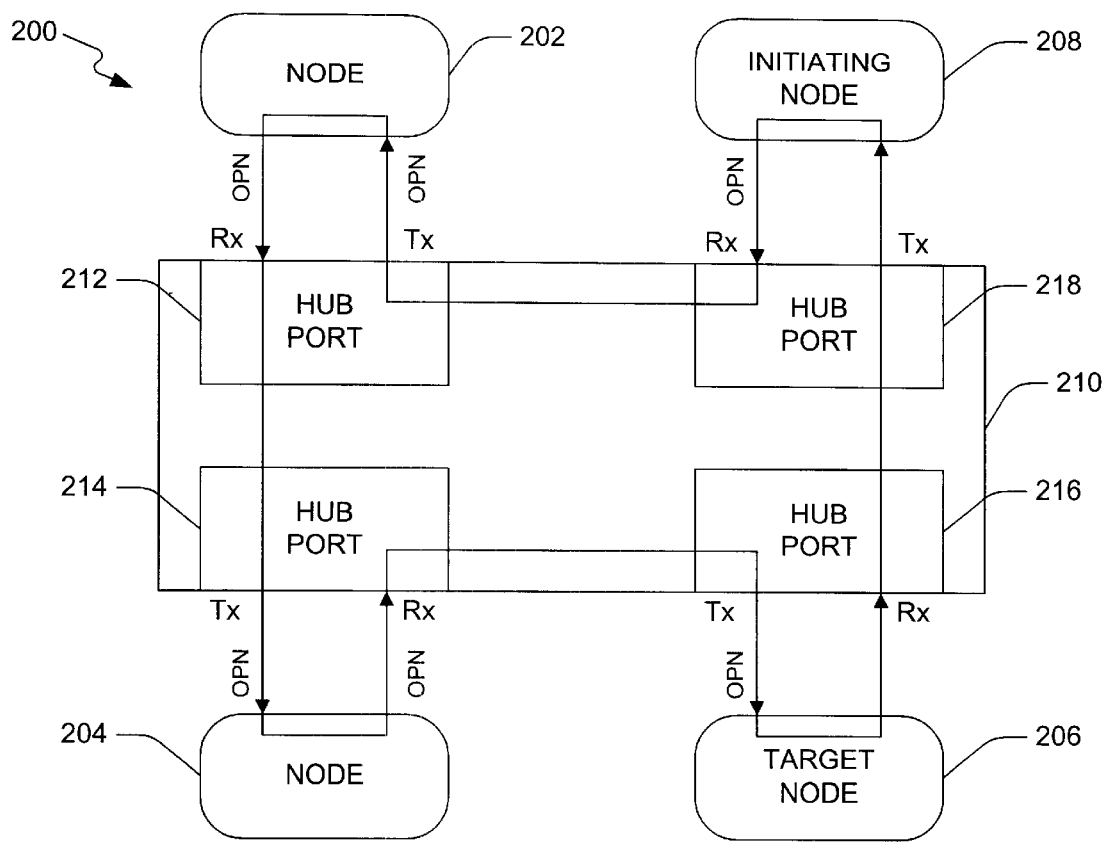
FIG. 2 shows a loop network including a hub.

FIG. 2 illustrates a loop 200 where node ports 202–208 are organized in a physical star topology With a hub 210 in the center. Node port 202 is connected to a hub port 212 in hub 210, as are node ports 204, 206, and 208 to their own respective hub ports 214, 216, and 218. A loop is internal to hub 210, where hub ports 212–218 form a loop data path similar to the loop configuration 100 shown in FIG. 1.

The use of a hub as a central component to a loop network allows bypassing of certain hub ports. This can be useful when one or more hub ports are not connected to node ports, or when one or more hub ports are connected to node ports that have failed. Each hub port often contains circuitry that provides a bypass mode for the hub port. When a hub port is in bypass mode, data received by the hub port from the previous hub port in the loop may be passed directly to the next hub port in the loop.

Before data transfer between devices connected to node ports can be initiated, the device that is initiating the transfer must arbitrate for using the loop. Once the arbitration is obtained, the device may establish a loop circuit between the initiating node port and the node port connecting the target device. The initiating node port sends out an Open (OPN) Ordered Set (OS) that contains an address of the target node port.

When a device receives an OPN Ordered Set, the node of. the device examines the address to determine if the device is the intended target. If the particular device is not the intended target, the node port forwards the OPN Ordered Set to the next node port in the loop. When the OPN Ordered Set arrives at the intended target node port, a loop circuit may be established. Once the loop circuit is established, data transfer may initiate between the initiating device and the target device.

In the illustrated embodiment of FIG. 2, for example, the initiating device is connected to the node port 208. The node port 208 may then send out an OPN Ordered Set containing an address of the target device connected to the node port 206. The node port 202, connected to the hub port 212, may examine the address and determine that it is not the intended target. Thus, the node port 202 may forward the OPN Ordered Set to the next node port 204, which is attached to the hub port 214 in the loop. The OPN Ordered Set may continue to get forwarded until it reaches the target node port 206. Once the node port 206 verifies the target address in the Ordered Set, a loop circuit may be established from the node port 208 to the node port 206. The loop circuit may pass through the hub port 218, the hub port 212, the node port-202, the hub port 214, the node port 204, and the hub port 216.

When the transmission between the initiating node 208 and the target node 206 completes, either the initiating node 208 or the target node 206 may terminate the loop circuit by sending a Close (CLS) Ordered Set. The other node will acknowledge the termination request by also issuing a CLS Order Set. The loop circuit is closed when the initiator and the target have both received and transmitted CLS Order Set. The loop is again ready for the next arbitration. For example, if the target node 206 needs to terminate the communication, it first sends out a CLS Order Set. This CLS will arrive at the initiating node 208. The node 208 may recognize that the target node 206 wants to terminate the loop circuit. The initiating node 208 may finish the current process and send out a CLS to the target node 206. The node 206 may receive the CLS sent by the node 208. At this time, the loop circuit is closed since both the target node 206 and the initiating node 208 have received and transmitted the CLS Order Set.

The number of OPN Ordered Sets generated by devices attached to a hub port may be counted to determine which device is most active in initiating loop circuits. The OPN Ordered Set origination count may be used to identify the hub port(s) that use the majority of the loop bandwidth. The network administrator may use this information to determine a network strategy.

In a Fibre Channel loop, devices may be connected in a closed circular, daisy-chained configuration. This configuration allows an OPN Ordered Set issued by an initiating node to transverse through multiple ports before reaching the intended target node. Under this configuration, the issued Ordered Set may be counted by more than one port. Therefore, a technique or a mechanism that enables the initiating hub port to count each OPN Ordered Set only once may be desirable. The hub port should be enabled to increment the OPN origination count only if the hub port is connected to the initiating node.

Figure 3:
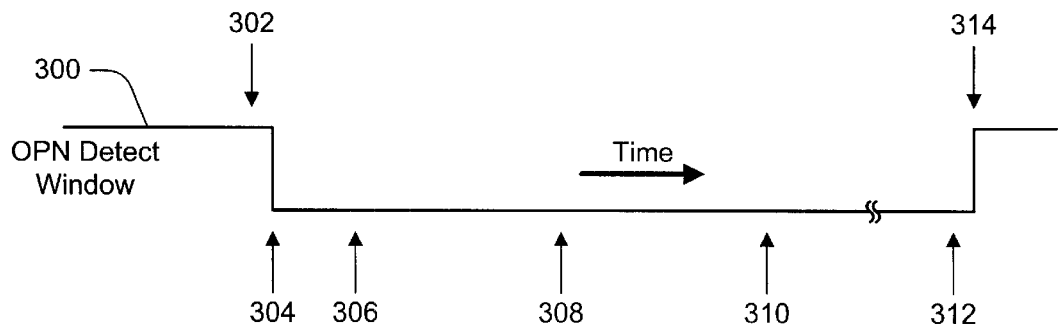
FIG. 3 is a timing diagram of an OPN Detect Window.

In one embodiment, illustrated as a timing diagram in FIG. 3, the hub creates a timing window called OPN Detect Window 300. This Window 300 may be opened when there is no active loop circuit. The Window 300 is closed when the initiating node attempts to establish the loop circuit by sending out OPN Ordered Set. This OPN Ordered Set is detected by the hub port. In this example, the hub port 218 closes the Window 300 when it detects an OPN OS from the node port 208. Operation of the OPN Detect Window 300 ensures that each OPN Ordered Set is counted only once by an appropriate hub port coupled to the initiating node port.

In the illustrated embodiment, the OPN Detect Window 300 is open when the signal is high, and the Window 300 is closed when the signal is low.

During the time that the OPN Detect Window 300 is open, all hub ports monitor data coming through the hub port receive (Rx) inputs. A hub port that first reports the detection of an OPN Ordered Set at 302 is the hub port that is connected to the initiating device. Thus, this hub port, such as the hub port 218, may be allowed to obtain the right to use the loop. An OPN origination counter of this hub port 218 may be incremented by one.

The OPN Detect Window 300 may be closed at 304, immediately after the first report of the OPN Ordered Set at 302. Once the OPN Detect Window 300 is closed at 304, any subsequent OPN Ordered Set detection reported by other hub ports at 306, 308, and 310 may be ignored. Therefore, the OPN origination counters of the hub ports 212, 214, 216 may remain unchanged.

In the above-described embodiment, once the OPN Detect Window 300 is closed and a loop circuit is established, the OPN Detect Window 300 may remain closed until both receive (Rx) input and transmit (Tx) output detect the CLS Ordered Set. Thus, the detection of both events may indicate that initiating and target nodes have terminated the loop circuit. The OPN Detect Window 300 may be opened again at 314, immediately after the detection of those events. Once the OPN Detect Window 300 opens, the Fibre Channel loop is idling. All hub ports may again check for the OPN Ordered Set at their respective receive inputs.

Figure 4:
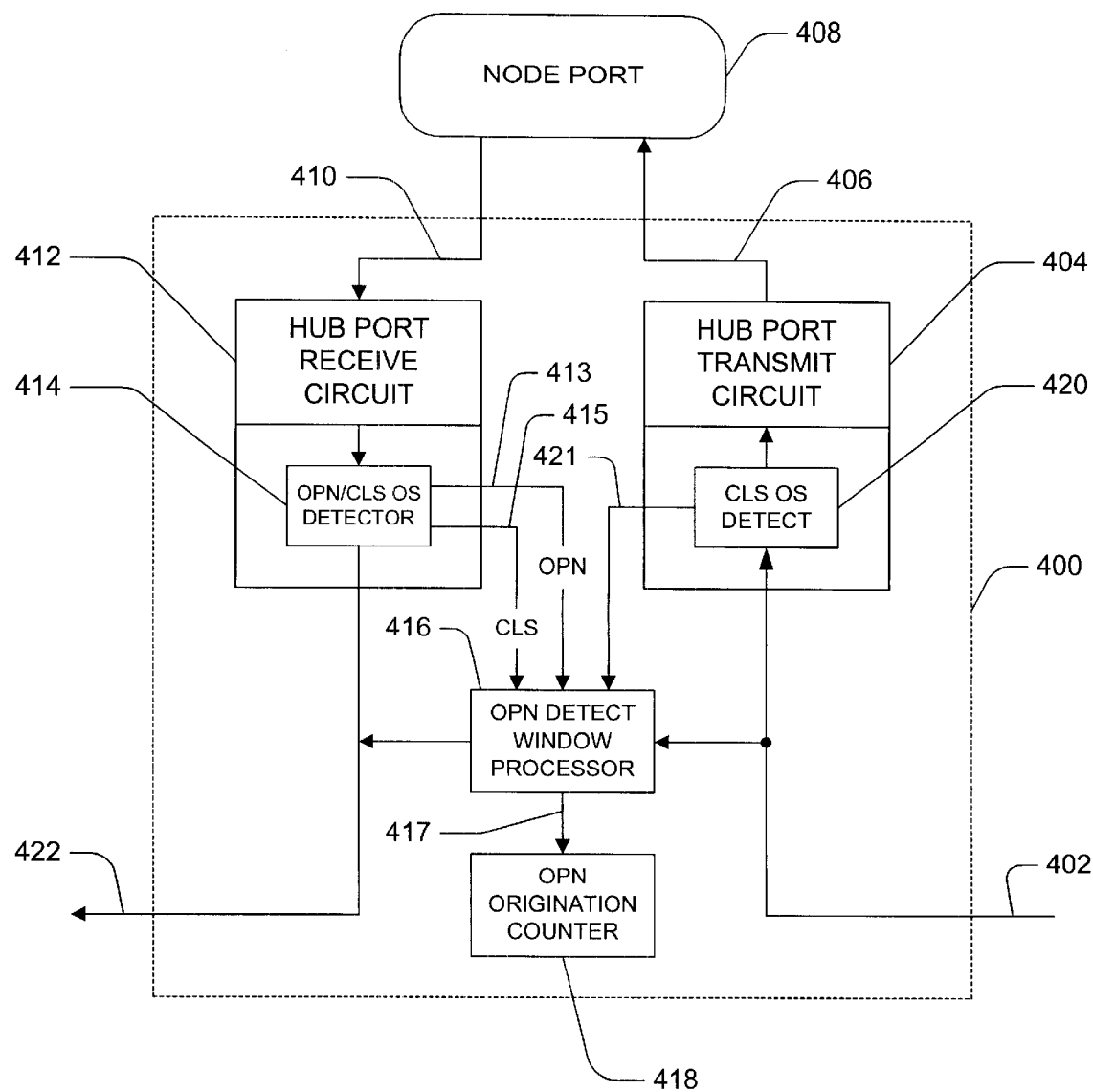
FIG. 4 is a block diagram of a hub port according to an embodiment.

FIG. 4 illustrates internal components of a hub port 400 according to an embodiment. In the illustrated embodiment, the hub port 400 provides for detection of OPN and CLS Ordered Sets within an OPN Detect Window to monitor OPN origination by the node port 408.

The hub port 400 as shown in FIG. 4 is equivalent to hub ports 212–218 shown in FIG. 2. An incoming internal hub link 402 enters the hub port 400 from a previous hub port in the loop (not shown). The incoming internal hub link 402 is connected to a hub port transmit circuit 404. Thus, data from the previous hub port passes along the internal hub link 402 into the hub port 400 and then into the hub port transmit circuit 404. The hub port transmit circuit 404 sends the received data through a data channel 406 to a node port 408 after converting the data into a form usable by the node port 408. Alternatively, the data channel 406 may be connected to a hub port in a different hub, allowing interconnection of hub to hub.

The node port 408 outputs data to the hub port 400 via a data channel 410. The data channel 410 is connected to a hub port receive circuit 412, which monitors data coming through the hub port receive (Rx) inputs. The hub port receive circuit 412 converts data received from the node port 408 into a form usable inside the hub. In one embodiment, the hub port receive circuit 412 converts data from serial to parallel and decodes the data.

The hub port receive circuit 412 may include an OPN/CLS Ordered Set (OS) detector 414. In one embodiment, the detector 414 may be programmed to detect other types of Ordered Sets.

When the OPN/CLS OS detector 414 detects an OPN Ordered Set, an OPN OS detect signal 413 may be sent to an OPN Detect Window processor 416. An appropriate setting of the OPN OS detect signal 413 indicates to the OPN Detect Window processor 416 that the OPN Ordered Set has been detected. The detection of the OPN Ordered Set, during the time that the OPN Detect Window is open, may indicate to the hub port 400 that the attached node port 408 is the initiating node. Therefore, if the OPN Detect Window is currently open, the OPN Detect Window processor 416 may issue a close window command to other hub ports in the hub. The hub port 400 may be allowed to obtain the right to use the loop. Further, an OPN origination detection signal 417 may be sent to an OPN origination counter 418 to increment an OPN origination count.

Otherwise, if the OPN Detect Window is closed, the OPN Detect Window processor 416 may ignore the signal 413. The closed OPN Detect Window may indicate to the hub port 400 that the attached node port 408 is not the initiating node. The detected OPN Ordered Set may be forwarded to the next hub port through outgoing internal hub link 422. Once the OPN Detect Window is closed and a loop circuit is established, the OPN Detect Window 300 may remain closed until the hub port.400 detects a CLS Ordered Set.

The hub port transmit circuit 404 may include a CLS Ordered Set (OS) detector 420. In one embodiment, the detector 420 may be programmed to detect other types of Ordered Sets.

When the CLS OS detector 420 detects a CLS Ordered Set, a transmit CLS OS detect signal 421 may be sent to an OPN Detect Window processor 416. The transmit CLS OS detect signal 421 indicates to the OPN Detect Window processor 416 that the CLS Ordered Set has been detected at the transmit (Tx) output. When the OPN/CLS OS detector 414 also detects the CLS Ordered Set, an appropriate setting of the receive CLS OS detect signal 415 may be sent to the OPN Detect Window processor 416. The appropriate setting of the receive CLS OS detect signal 415 indicates to the OPN Detect Window processor 416 that the CLS Ordered Set has been detect at the receive (Rx) input. Once the CLS Ordered Set has been received at both the Rx input and the Tx output, the initiating node and the target node may have terminated the loop circuit. The OPN Detect Window processor 416 may open the OPN Detect Window. The Fibre Channel loop is in an idle mode again.

In some embodiments, such as in the case of a loop error, a hub manager may intervene on the status of the OPN Detect Window. For example, if a hub port detects an OPN Ordered Set but does not detect a CLS Ordered Set, the OPN Detect Window may get stuck in an open state. In such a case, the hub manager may optionally issue a control bit to the OPN Detect Window processor 416 to reset the Window.

Figure 5:
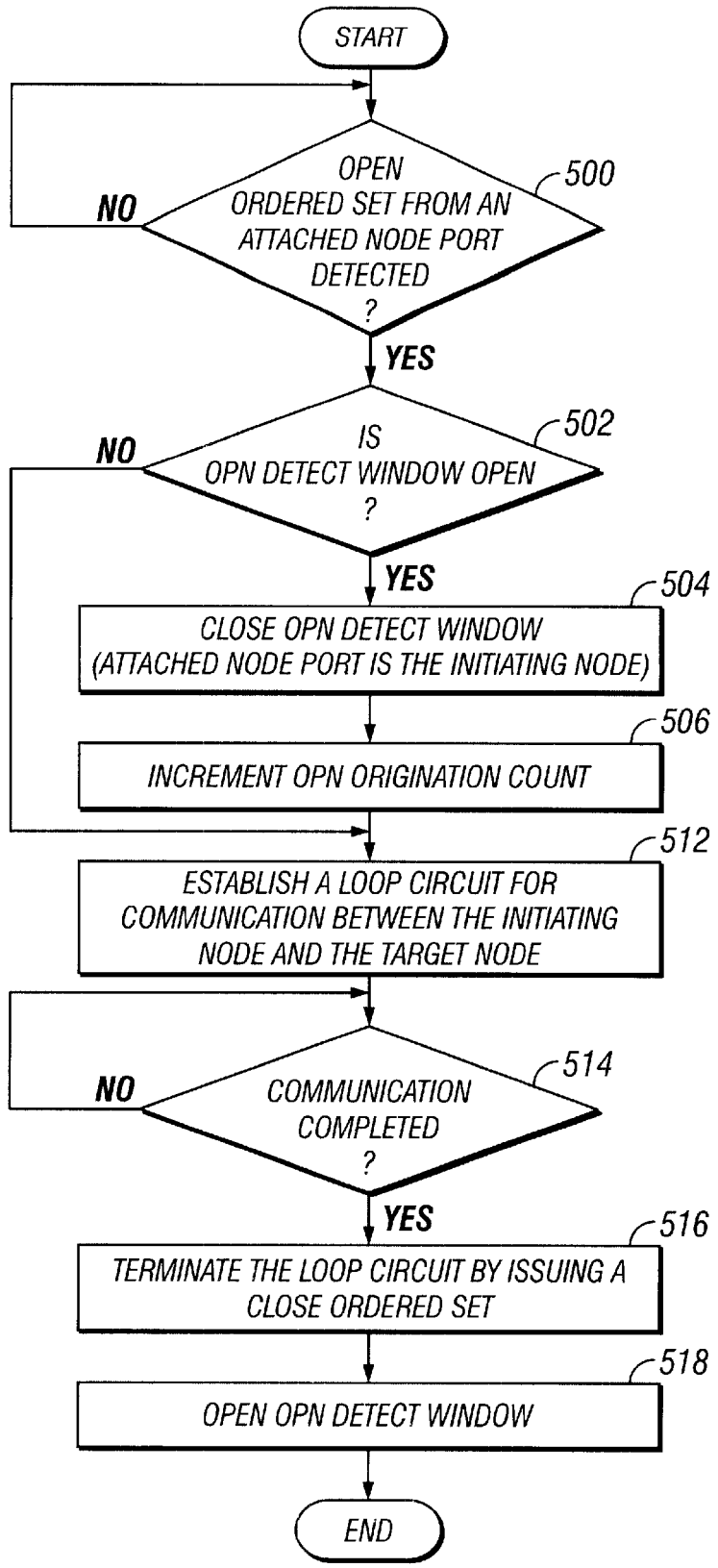
FIG. 5 shows a method for determining and counting each Open Ordered Set originating from an attached node port according an embodiment.

FIG. 5 illustrates a method for determining and counting Open (OPN) Ordered Sets originating from an attached node port according an embodiment. As described above, the OPN Ordered Set is issued to establish a communication connection between an initiating node and a target node.

The method includes monitoring an OPN Ordered Set from an attached node port at 500. If the OPN Ordered Set is detected, an OPN Detect Window may be examined to determine if the Window is open at 502. If the Window is open, it indicates that the attached node port is the initiating node. The OPN Detect Window is closed at 504 to prevent other hub ports from erroneously determining that their attached node ports initiated the Ordered Set. An OPN origination count is incremented at 506.

At 512, a loop circuit is established for communication between the initiating node and the target node. The loop is checked for communication completion at 514. If the communication has been completed, the loop circuit is terminated by issuing a Close Ordered Set at 516. The OPN Detect Window may be opened again, at 518, to allow next establishment of the loop circuit between the initiating node and the target node.

While specific embodiments of the invention have been illustrated and described, other embodiments and variations are possible. For example, the OPN Detect Window processor and the OPN origination counter may be implemented in software to detect and count OPN Ordered Set origination.

All these are intended to be encompassed by the following claims.

What is claimed is:

1. A hub port in a loop network, comprising:
   a hub data source for supplying data to the hub port from the loop network;
   a first detect circuit configured to detect a first sequence from an attached node port establishing a loop circuit, and a second sequence from the attached node port indicating to terminate the loop circuit;
   a processor configured to receive said first sequence from said first detect circuit, said processor operating to close a detect window and to increment a sequence origination count if the detect window is open; and
   a second detect circuit configured to detect said second sequence from the hub data source confirming to terminate the loop circuit.

2. The hub port of claim 1, wherein said loop network is a Fibre Channel.

3. The hub port of claim 2, wherein said first sequence is an open (OPN) ordered set.

4. The hub port of claim 2, wherein said second sequence is a close (CLS) ordered set.

5. The hub port of claim 1, further comprising:
   a counter configured to save said sequence origination count.

6. A hub port in a Fibre Channel loop, comprising:
   a hub data source for supplying data to the hub port from the Fibre Channel loop;
   an ordered set detector configured to detect a sequence of ordered sets from an attached node port establishing and terminating a loop circuit; and
   a processor configured to increment a count value if a sequence detect window is open, said processor operating to close the opened sequence detect window after receiving an open ordered set.

7. The hub port of claim 6, wherein said ordered set detector includes:
   a first detect circuit configured to detect an open ordered set from an attached node port to establish the loop circuit, and a close ordered set from the attached node port indicating to terminate the loop circuit;
   a second detect circuit configured to detect said close ordered set from the hub data source confirming to terminate the loop circuit.

8. A loop network having a hub, comprising:
   a plurality of node ports;
   a plurality of hub ports in the hub, each hub port coupled to one of said plurality of node ports, each hub port including:
   a hub data source for supplying data to the hub port from the loop network;
   an ordered set detector configured to detect a sequence of ordered sets from an attached node port establishing and terminating a loop circuit; and
   a processor configured to increment a count value if a sequence detect window is open, said processor operating to close the opened sequence detect window after receiving an open ordered set.

9. A method for detecting and counting open ordered sets, comprising:

monitoring for an open ordered set originating from an attached node port;

examining an open detect window if the open ordered set is detected; and closing the open detect window and incrementing an open ordered set origination count, if the open detect window is open.

10. The method of claim 9, wherein said incrementing said open ordered set origination count indicates that the attached node port is an initiating node port.

11. The method of claim 10, further comprising:

establishing a loop circuit between the initiating node port and a target node port.

12. The method of claim 11, further comprising:

terminating the loop circuit by issuing a close ordered set, when communication between the initiating node port and the target node port is completed.

13. The method of claim 12, further comprising:

opening the open detect window.

14. A method for detecting and counting open ordered sets from an attached port, comprising:

monitoring for an open ordered set;

examining an open detect window if the open ordered set is detected;

closing the open detect window and incrementing an open ordered set origination count, if the open detect window is open;

establishing a loop circuit between the initiating node port and a target node port;

terminating the loop circuit by issuing a close ordered set, when communication between the initiating node port and the target node port is completed; and opening the open detect window.

15. An apparatus comprising a computer-readable storage medium having executable instructions that enable the computer to:

monitor for an open ordered set originating from an attached node port;

examine an open detect window if the open ordered set is detected; and close the open detect window and increment an open ordered set origination count, if the open detect window is open.

16. An apparatus comprising a computer-readable storage medium having executable instructions that enable the computer to:

monitor for an open ordered set;

examine an open detect window if the open ordered set is detected;

close the open detect window and increment an open ordered set origination count, if the open detect window is open;

establish a loop circuit between the initiating node port and a target node port;

terminate the loop circuit by issuing a close ordered set, when communication between the initiating node port and the target node port is completed; and open the open detect window.

* * * * *